(12) United States Patent  
Oshima et al.

(10) Patent No.: US 11,949,064 B2  
(45) Date of Patent: Apr. 2, 2024

(54) NEGATIVE ELECTRODE MATERIAL, BATTERY, AND METHOD FOR PRODUCING BATTERY

(71) Applicant: Panasonic Intellectual Property Management Co., Ltd., Osaka (JP)

(72) Inventors: Tatsuya Oshima, Osaka (JP); Izuru Sasaki, Aichi (JP); Yuta Sugimoto, Hyogo (JP); Seiji Nishiyama, Osaka (JP); Masashi Sakaida, Hyogo (JP); Akira Kawase, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 593 days.

(21) Appl. No.: 17/160,930

(22) Filed: Jan. 28, 2021

(65) Prior Publication Data

US 2021/0151791 A1    May 20, 2021

Related U.S. Application Data

(63) Continuation of application No. PCT/JP2019/040063, filed on Oct. 10, 2019.

(30) Foreign Application Priority Data

Nov. 29, 2018    (JP) ................. 2018-224239

(51) Int. Cl.
*H01M 10/0562* (2010.01)
*H01M 4/62* (2006.01)
(Continued)

(52) U.S. Cl.
CPC ......... *H01M 10/0562* (2013.01); *H01M 4/62* (2013.01); *H01M 10/0525* (2013.01);
(Continued)

(58) Field of Classification Search
CPC ........ H01M 10/0525; H01M 10/0562; H01M 10/0585; H01M 10/446; H01M 2004/027;
(Continued)

(56) References Cited

U.S. PATENT DOCUMENTS 4,352,869 A    10/1982    Mellors  
5,506,073 A    4/1996    Angell et al.  
(Continued)

FOREIGN PATENT DOCUMENTS

CN    105254184 A    1/2016  
CN    105680048 A    6/2016  
(Continued)

OTHER PUBLICATIONS

International Search Report of International Application No. PCT/JP2018/043363 dated Feb. 19, 2019.
(Continued)

*Primary Examiner* — Victoria H Lynch  
(74) *Attorney, Agent, or Firm* — Rimon P.C.

(57) ABSTRACT

The present disclosure provides a negative electrode material that can improve the cycle characteristics of a battery. The negative electrode material according to the present disclosure contains a reduced form of a solid electrolyte material. The solid electrolyte material is denoted by Formula (1): $Li_\alpha M_\beta X_\gamma$. Herein, in Formula (1), each of α, β, and γ is a value greater than 0, M represents at least one element selected from the group consisting of metal dements except Li and semimetals, and X represents at least one dement selected from the group consisting of F, Cl, Br, and I.

10 Claims, 6 Drawing Sheets

(51) Int. Cl.
  *H01M 10/0525* (2010.01)
  *H01M 10/0585* (2010.01)
  *H01M 10/44* (2006.01)
  *H01M 4/02* (2006.01)

(52) U.S. Cl.
  CPC ..... *H01M 10/0585* (2013.01); *H01M 10/446* (2013.01); *H01M 2004/027* (2013.01); *H01M 2300/008* (2013.01)

(58) Field of Classification Search
  CPC ......... H01M 2300/008; H01M 4/0447; H01M 4/582; H01M 4/62; Y02E 60/10; Y02P 70/50
  See application file for complete search history.

(56) References Cited

U.S. PATENT DOCUMENTS

| | | | |
|---|---|---|---|
| 5,714,279 | A | 2/1998 | Zajac, Jr. et al. |
| 6,428,935 | B1 | 8/2002 | Takada et al. |
| 9,160,034 | B2 | 10/2015 | Kato et al. |
| 10,008,735 | B2 | 6/2018 | Ohtomo et al. |
| 2004/0151986 | A1 | 8/2004 | Park et al. |
| 2011/0045355 | A1 | 2/2011 | Ichikawa |
| 2011/0300444 | A1 | 12/2011 | Nakamura |
| 2012/0301796 | A1 | 11/2012 | Ohtomo et al. |
| 2012/0308900 | A1 | 12/2012 | Ogasa |
| 2013/0295464 | A1 | 11/2013 | Yanagi et al. |
| 2015/0147659 | A1 | 5/2015 | Kato |
| 2016/0103232 | A1 | 4/2016 | Ouspenski et al. |
| 2016/0149259 | A1 | 5/2016 | Osada et al. |
| 2016/0156064 | A1 | 6/2016 | Miyashita et al. |
| 2016/0204467 | A1 | 7/2016 | Nogami et al. |
| 2016/0248119 | A1 | 8/2016 | Kato |
| 2016/0268630 | A1 | 9/2016 | Tsukada et al. |
| 2016/0285078 | A1 | 9/2016 | Deschamps et al. |
| 2016/0308210 | A1 | 10/2016 | Sakuda et al. |
| 2016/0359192 | A1 | 12/2016 | Homma et al. |
| 2016/0359193 | A1 | 12/2016 | Yi et al. |
| 2017/0040637 | A1 | 2/2017 | Ceder et al. |
| 2017/0179481 | A1 | 6/2017 | Yamada et al. |
| 2017/0187066 | A1 | 6/2017 | Tsujimura et al. |
| 2017/0222257 | A1 | 8/2017 | Miyashita et al. |
| 2017/0229734 | A1 | 8/2017 | Furukawa et al. |
| 2017/0288281 | A1 | 10/2017 | Chiang et al. |
| 2017/0309964 | A1 | 10/2017 | Iwamoto |
| 2018/0076452 | A1 | 3/2018 | Sasaki et al. |
| 2018/0183065 | A1 | 6/2018 | Sasaki |
| 2018/0269521 | A1 | 9/2018 | Ohtomo et al. |
| 2019/0067736 | A1 | 2/2019 | Yoshioka et al. |
| 2019/0088995 | A1 | 3/2019 | Asano et al. |
| 2019/0097266 | A1 | 3/2019 | Yamamoto et al. |
| 2020/0212481 | A1 | 7/2020 | Nagamine et al. |
| 2020/0328454 | A1 | 10/2020 | Sakai et al. |
| 2020/0328455 | A1 | 10/2020 | Sakai et al. |
| 2020/0328457 | A1 | 10/2020 | Sakai et al. |
| 2020/0328460 | A1 | 10/2020 | Asano et al. |
| 2020/0328461 | A1 | 10/2020 | Asano et al. |
| 2020/0328462 | A1 | 10/2020 | Asano et al. |
| 2020/0328464 | A1 | 10/2020 | Asano et al. |
| 2020/0328465 | A1 | 10/2020 | Sakaida et al. |
| 2020/0328468 | A1 | 10/2020 | Sakaida et al. |
| 2020/0328469 | A1 | 10/2020 | Asano et al. |
| 2020/0335817 | A1 | 10/2020 | Asano et al. |
| 2020/0350561 | A1 | 11/2020 | Kamitake et al. |
| 2020/0350615 | A1 | 11/2020 | Sakaida et al. |
| 2020/0350621 | A1 | 11/2020 | Sugimoto et al. |
| 2020/0350622 | A1 | 11/2020 | Sakaida et al. |
| 2020/0350624 | A1 | 11/2020 | Sasaki et al. |
| 2021/0151792 | A1 | 5/2021 | Oshima et al. |

FOREIGN PATENT DOCUMENTS

| | | |
|---|---|---|
| CN | 108701860 A | 10/2018 |
| EP | 2916381 B1 | 6/2016 |
| EP | 3043411 A1 | 7/2016 |
| EP | 3428929 A1 | 1/2019 |
| EP | 3496202 A1 | 6/2019 |
| EP | 3736827 A1 | 11/2020 |
| EP | 3736829 A1 | 11/2020 |
| EP | 3736831 A1 | 11/2020 |
| EP | 3736834 A1 | 11/2020 |
| EP | 3736899 A1 | 11/2020 |
| EP | 3745422 A1 | 12/2020 |
| EP | 3745518 A1 | 12/2020 |
| EP | 3863028 A1 | 8/2021 |
| IN | 201847045950 A | 2/2019 |
| JP | S57-132677 A | 8/1982 |
| JP | H05-306117 A | 11/1993 |
| JP | H08-171938 A | 7/1996 |
| JP | H09-293516 A | 11/1997 |
| JP | H11-238528 A | 8/1999 |
| JP | 2001-052733 A | 2/2001 |
| JP | 2004-235155 A | 8/2004 |
| JP | 2006-244734 A | 9/2006 |
| JP | 2008-021556 A | 1/2008 |
| JP | 2008-060033 | 3/2008 |
| JP | 2008-234988 | 10/2008 |
| JP | 2011-129312 | 6/2011 |
| JP | 2011-253762 | 12/2011 |
| JP | 5076134 B2 | 11/2012 |
| JP | 2012-246196 A | 12/2012 |
| JP | 2013-073791 A | 4/2013 |
| JP | 2015-011901 A | 1/2015 |
| JP | 2015-032529 A | 2/2015 |
| JP | 2015-056349 A | 3/2015 |
| JP | 2016-024874 A | 2/2016 |
| JP | 2016-171067 A | 9/2016 |
| JP | 2017-059342 A | 3/2017 |
| JP | 2017-091953 A | 5/2017 |
| JP | 2017-091955 A | 5/2017 |
| JP | 2017-111954 | 6/2017 |
| JP | 2017-117753 A | 6/2017 |
| JP | 2017-518622 A | 7/2017 |
| JP | 2017-152324 A | 8/2017 |
| JP | 2017-199668 | 11/2017 |
| JP | 6222134 B2 | 11/2017 |
| JP | 2017-224474 A | 12/2017 |
| WO | 2000/028608 | 5/2000 |
| WO | 2011/073798 A2 | 6/2011 |
| WO | 2015/011937 A1 | 1/2015 |
| WO | 2015/030052 A1 | 3/2015 |
| WO | 2015/049986 A1 | 4/2015 |
| WO | 2015/136623 | 9/2015 |
| WO | 2017/047015 | 3/2017 |
| WO | 2017/108105 A1 | 6/2017 |
| WO | 2017/154766 A1 | 9/2017 |
| WO | 2017/154922 A1 | 9/2017 |
| WO | 2018/025582 | 2/2018 |
| WO | 2018/025582 A1 | 2/2018 |

OTHER PUBLICATIONS

International Search Report of International Application No. PCT/JP2018/041893 dated Feb. 19, 2019.
International Search Report of International Application No. PCT/JP2018/041892 dated Feb. 19, 2019.
International Search Report of International Application No. PCT/JP2018/041894 dated Feb. 19, 2019.
International Search Report of International Application No. PCT/JP2018/046258 dated Feb. 5, 2019.
International Search Report of International Application No. PCT/JP2018/046259 dated Mar. 12, 2019.
International Search Report of International Application No. PCT/JP2018/046260 dated Mar. 12, 2019.
International Search Report of International Application No. PCT/JP2018/046262 dated Mar. 19, 2019.
International Search Report of International Application No. PCT/JP2018/041900 dated Feb. 19, 2019.
International Search Report of International Application No. PCT/JP2018/041897 dated Feb. 19, 2019.
International Search Report of International Application No. PCT/JP2018/046263 dated Mar. 19, 2019.

(56) References Cited

OTHER PUBLICATIONS

International Search Report of International Application No. PCT/JP2018/042061 dated Feb. 19, 2019.
International Search Report of International Application No. PCT/JP2018/042062 dated Feb. 19, 2019.
Yasumasa Tomita et al., "Lithium ion conductivity of Li3InBr6 doped with different element", Denka Chemical Society 70th Anniversary Conference Abstracts, Mar. 25, 2003, p. 384; with English translation.
Yasumasa Tomita et al., "Preparation of Substituted Compounds of Lithium Indium Bromide and Fabrication of All Solid-State battery", Recent Innovations in Chemical Engineering, 2017, 10, 12-17.
The Extended European Search Report dated Jan. 29, 2021 for the related European Patent Application No. 18898666.5.
The Extended European Search Report dated Feb. 5, 2021 for the related European Patent Application No. 18898795.2.
The Extended European Search Report dated Feb. 9, 2021 for the related European Patent Application No. 18898242.5.
The Extended European Search Report dated Feb. 9, 2021 for the related European Patent Application No. 18898043.7.
The Extended European Search Report dated Feb. 9, 2021 for the related European Patent Application No. 18898663.2.
The Extended European Search Report dated Feb. 9, 2021 for the related European Patent Application No. 18898873.7.
The Extended European Search Report dated Feb. 9, 2021 for the related European Patent Application No. 18898935.4.
The Extended European Search Report dated Feb. 9, 2021 for the related European Patent Application No. 18902720.4.
The Extended European Search Report dated Feb. 9, 2021 for the related European Patent Application No. 18898525.3.
The Extended European Search Report dated Feb. 10, 2021 for the related European Patent Application No. 18898462.9.
The Extended European Search Report dated Feb. 15, 2021 for the related European Patent Application No. 18898524.6.
Lutz H D et al: "Ionic motion of tetrahedrally and octahedrally coordinated lithium ions in ternary and quaternary halides", Solid State Ionics, North Holland Pub. Company. Amsterdam; NL, NL, vol. 28-30, Sep. 1, 1988?(Sep. 1, 1988), pp. 1282-1286, XP024682689.
Tetsuya Asano; Akihiro Sakai; Satoru Ouchi; Masashi Sakaida; Akinobu Miyazaki; Shinya Hasegawa: "Solid Halide Electrolytes with High Lithium-Ion Conductivity for Application in 4 V Class Bulk-Type All-Solid-State Batteries", Advanced Materials, vol. 30, No. 44, Sep. 14, 2018?(Sep. 14, 2018), p. 1803075, XP055721991.
International Search Report of International Application No. PCT/JP2018/046264 dated Mar. 19, 2019.
International Search Report of International Application No. PCT/JP2018/045588 dated Mar. 19, 2019.
International Search Report of International Application No. PCT/JP2018/042060 dated Jan. 29, 2019.
International Search Report of International Application No. PCT/JP2019/040062 dated Dec. 24, 2019.
International Search Report of International Application No. PCT/JP2019/040063 dated Dec. 24, 2019.
Andreas Bohnsack et al., "The Bromides Li3MBr6 (M=Sm—Lu, Y): Synthesis, Crystal Structure, and Ionic Mobility", Journal of Inorganic and General Chemistry, Sep. 1997, vol. 623/Issue 9, pp. 1352-1356.
Andreas Bohnsack et al., "Ternary Chlorides of the Rare-Earth Elements with Lithium, Li3MCl6 (M=Tb—Lu, Y, Sc): Synthesis, Crystal Structures, and Ionic Motion", Journal of Inorganic and General Chemistry, Jul. 1997, vol. 623/Issue 7, pp. 1067-1073.
The Extended European Search Report dated Feb. 11, 2021 for the related European Patent Application No. 18902871.5.
The Extended European Search Report dated Feb. 10, 2021 for the related European Patent Application No. 18902731.1.
The Extended European Search Report dated Feb. 17, 2021 for the related European Patent Application No. 18902279.1.
The Extended European Search Report dated Dec. 20, 2021 for the related European Patent Application No. 19891097.8.
English Translation of Chinese Search Report dated Jul. 6, 2021 for the related Chinese Patent Application No. 201880071236.0.
English Translation of Chinese Search Report dated Jul. 30, 2021 for the related Chinese Patent Application No. 201880071076.X.
English Translation of Chinese Search Report dated Aug. 2, 2021 for the related Chinese Patent Application No. 201880070620.9.
Indian Examination Report dated Apr. 4, 2022 for the related Indian Patent Application No. 202047027797.
Indian Examination Report dated Apr. 4, 2022 for the related Indian Patent Application No. 202047027476.
Indian Examination Report dated Apr. 29, 2022 for the related Indian Patent Application No. 202047027475.
Indian Examination Report dated May 25, 2022 for the related Indian Patent Application No. 202047027723.
Indian Examination Report dated Jun. 13, 2022 for the related Indian Patent Application No. 202047027726.
Indian Examination Report dated Jun. 14, 2022 for the related Indian Patent Application No. 202047027488.
Tomita, Y. et al., "Substitution effect of ionic conductivity in lithium ion conductor, Li3InBr6-xClx.," Solid State Ionics 179.21-26 (2008): 867-870. (Year: 2008).
Steiner, H-J., and H. D. Lutz, "Neue schnelle Ionenleiter vom Typ MI3 MIIICl6 (Mi=Li, Na, Ag; MIII=In, Y)." Zeitschrift fur anorganhische und allgemeine Chemie 613.7 (1992): 26-30 (Year: 1992).
International Search Report of PCT application No. PCT/JP2019/040063 dated Dec. 24, 2019.
Tomita, Yasumasa et al. "Substitution effect in the ion conductor Li3InBr6, studied by nuclear magnetic resonance." Zeitschrift fur Naturforschung A 57.6-7 (2002): 447-450 (Year: 2002).
Tomita, Yasumasa et al. "Synthesis of Li3+ xIn1-xMxBr6 (M=Zn, Co, Fe) by Nano-grinding and their Ionic Conductivity." Transactions of the Materials Research Society of Japan 33.4 (2008): 973-976 (Year: 2008).
G. J. Kipouros et al. Reversible Electrode Potentials for Formation of Solid and Liquid Chlorozirconate and Chlorohafnate Compounds (Year: 1992).
Indian Examination Report dated Jun. 21, 2022 for the related Indian Patent Application No. 202047027487.
William D. Richards et al., "Interface Stability in Solid-State Batteries", Chemistry of Materials, 2016, vol. 28, Dec. 7, 2015, pp. 266-273.
Fudong Han et al. "A Battery Made from a Single Material", Advanced Materials, 27 (2015), pp. 3473-3483.
International Search Report of International Application No. PCT/JP2018/045584 dated Mar. 19, 2019.

NEGATIVE ELECTRODE MATERIAL, BATTERY, AND METHOD FOR PRODUCING BATTERY

BACKGROUND

1. Technical Field

The present disclosure relates to a negative electrode material, a battery, and a method for producing a battery.

2. Description of the Related Art

F. Han et al., "A Battery Made from Single Material", Adv. Mater. 27 (2015), 3473-3483 discloses an all-solid lithium ion battery in which a sulfide solid electrolyte material is used as a negative electrode material.

SUMMARY

Regarding the related art, it is desirable to further improve the cycle characteristics of a battery.

In one general aspect, the techniques disclosed here feature a negative electrode material according to an aspect of the present disclosure includes a reduced form of a solid electrolyte material, wherein the solid electrolyte material is denoted by Formula (1) below, $$Li_\alpha M_\beta X_\gamma \quad \text{Formula (1)}$$

herein, in Formula (1), each of α, β, and γ is a value greater than 0, M represents at least one element selected from the group consisting of metal elements except Li and semimetals, and X represents at least one element selected from the group consisting of F, Cl, Br, and I.

According to the present disclosure, the cycle characteristics of the battery can be improved.

Ig should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

The embodiments according to the present disclosure will be described below with reference to the drawings.

First Embodiment

A negative electrode material according to the first embodiment contains a reduced form (hereafter also referred to as "halide reduced form") of a solid electrolyte material (hereafter also referred to as "halide solid electrolyte material"). The halide solid electrolyte material is a material denoted by Formula (1) below.

$$Li_\alpha M_\beta X_\gamma \quad \text{Formula (1)}$$

Herein, in Formula (1) above, each of α, β, and γ is a value greater than 0. In addition, M represents at least one element selected from the group consisting of metal elements except Li and semimetals. X represents at least one element selected from the group consisting of F, Cl, Br, and I.

In this regard, "semimetals" include B, Si, Ge, As, Sb, and Te.

Meanwhile, "metal elements" include
(i) all elements except hydrogen which are included in groups I to XII of the periodic table, and
(ii) all elements except B, Si, Ge, As, Sb, Te, C, N, P, O, S, and Se which are included in groups XIII to XVI of the periodic table. That is, "metal elements" are a group of elements that may become cations when forming inorganic compounds with halides.

The negative electrode material according to the first embodiment can improve the cycle characteristics of a battery due to the above-described configuration. In this regard, the cycle characteristics of the battery denote a discharge capacity maintenance factor after a charge-discharge cycle is repeated. The discharge capacity maintenance factor can be determined by using the following formula.

discharge capacity maintenance factor (%)=(discharge capacity after repetition of charge-discharge cycle)/(discharge capacity of first cycle)×100

As described above, F. Han et al., "A Battery Made from Single Material", Adv. Mater. 27 (2015), 3473-3483 cited in the section "Background Art" discloses a battery in which the negative electrode material is the reduced form of the sulfide solid electrolyte material (hereafter also referred to as "sulfide reduced form"). The present inventors performed intensive research and, as a result, found that a battery in which a sulfide reduced material was used as a negative electrode material had a problem of deterioration in cycle characteristics of the battery because of low electron conductivity of the sulfide reduced form and the like. The above-described halide reduced form exhibits favorable electron conductivity. Therefore, the negative electrode material according to the first embodiment can improve the cycle characteristics of the battery. In addition, the negative electrode material containing the halide reduced form can also realize a high discharge capacity compared with the negative electrode material containing the sulfide reduced form.

The halide solid electrolyte material in the first embodiment may satisfy
$1 \leq \alpha \leq 5$,
$0 < \beta \leq 2$, and
$5.5 \leq \gamma \leq 6.5$
in Formula (1) above.

In addition, the halide solid electrolyte material in the first embodiment may satisfy
$1.5 \leq \alpha \leq 4.5$,
$0.5 \leq \beta \leq 1.5$, and
$\gamma = 6$
in Formula (1).

Further, the halide solid electrolyte material in the first embodiment may satisfy,
$2.5 \leq \alpha \leq 3$,
$1 \leq \beta \leq 1.1$, and
$\gamma = 6$
in Formula (1).

The halide solid electrolyte material satisfying the above-described numerical range enables the cycle characteristics of the battery to be further improved. In addition, in the case in which the halide solid electrolyte material satisfies the above-described numerical range, a crystal structure having high ionic conductivity is provided, and a halide reduced form can be efficiently generated.

The halide solid electrolyte material in the first embodiment may satisfy the relationship represented by $\alpha + m\beta = \gamma$ in Formula (1). Herein, m represents the valence of M. In this regard, in the case in which M contains a plurality of types of elements, $m\beta$ is the total of the products of the respective composition ratios of the elements multiplied by the respective valences of the elements. For example, in the case in which M contains an element M1 and an element M2, the composition ratio of the element M1 is $\beta_1$, the valence of the element M1 is $m_1$, the composition ratio of the element M2 is $\beta_2$, and the valence of the element M2 is $m_2$, $m\beta = m_1\beta_1 + m_2\beta_2$ applies. In the case in which M is considered to have a plurality of valences, the above-described relational formula has to be satisfied with respect to each of the valences, where m takes on the respective valence.

According to the above-described configuration, the cycle characteristics of the battery can be further improved.

In Formula (1) above, M may contain at least one element selected from the group consisting of transition metal elements.

According to the above-described configuration, the cycle characteristics of the battery can be further improved.

In Formula (1) above, M may contain at least one selected from the group consisting of yttrium (=Y) and zirconium (=Zr).

In Formula (1) above, M may contain Y. That is, the halide solid electrolyte material may contain Y as a metal element.

The halide solid electrolyte material containing Y may be denoted by Formula (2) below.

Formula (2)

Herein, in Formula (2), a, b, and c satisfies $a + m_1b + 3c = 6$ and $c > 0$, and Me1 represents at least one element selected from the group consisting of metal elements except Li and Y and semimetals. In addition, $m_1$ represents the valence of Me1 In this regard, in the case in which Me1 contains a plurality of types of elements, $m_1b$ is the total of the products of the respective composition ratios of the elements multiplied by the respective valences of the elements. For example, in the case in which Me1 contains an element Me11 and an element Me12, the composition ratio of the element Me11 is $b_{11}$, the valence of the element Me11 is $m_{11}$, the composition ratio of the element Me12 is $b_{12}$, and the valence of the element Me12 is $m_{12}$, $m_1b = m_{11}b_{11} + m_{12}b_{12}$ applies. In this regard, Me1 may be at least one selected from the group consisting of Mg, Ca, Sr, Ba, Zn, Sc, Al, Ga, Bi, Zr, Hf, Ti, Sn, Ta, and Nb. In the case in which Me1 is considered to have a plurality of valences, the above-described relational formula has to be satisfied with respect to each of the valences, where $m_1$ takes on the respective valence.

In the negative electrode material according to the first embodiment, in the case in which the halide solid electrolyte material satisfies Formula (2) above, the negative electrode material according to the first embodiment can occlude and release Li by exploiting the change in valence of Y so as to further improve the cycle characteristics of the battery.

In Formula (1) above, M may contain Zr. That is, the halide solid electrolyte material may contain Zr as a metal element.

The halide solid electrolyte material containing Zr may be denoted by Formula (3) below.

Formula (3)

Herein, in Formula (3), d, e, and f satisfies $d + m_2e + 3f = 6$ and $f > 0$, and Me2 represents at least one element selected from the group consisting of metal elements except Li, Y, and Zr and semimetals. In addition, $m_2$ represents the valence of Me2 above.

In this regard, in the case in which Me2 contains a plurality of types of elements, $m_2e$ is the total of the products of the respective composition ratios of the elements multiplied by the respective valences of the elements. For example, in the case in which Me2 contains an element Me21 and an element Me22, the composition ratio of the element Me21 is $e_{21}$, the valence of the element Me21 is $m_{21}$, the composition ratio of the element Me22 is $e_{22}$, and the valence of the element Me22 is $m_{22}$, $m_2e = m_{21}e_{21} + m_{22}e_{22}$ applies. In this regard, Me2 may be at least one selected from the group consisting of Mg, Ca, Sr, Ba, Zn, Sc, Al, Ga, Bi, Hf, Ti, Sn, Ta, and Nb. In the case in which Me2 is considered to have a plurality of valences, the above-described relational formula has to be satisfied with respect to each of the valences, where m2 takes on the respective valence.

In the negative electrode material according to the first embodiment, in the case in which the halide solid electrolyte material satisfies Formula (3) above, the negative electrode material according to the first embodiment can occlude and release Li by exploiting the change in valence of Zr so as to further improve the cycle characteristics of the battery.

The halide solid electrolyte material in the first embodiment may be a material denoted by Composition formula (4) below.

Formula (4)

Herein, in Composition formula (4), X represents at least two elements selected from the group consisting of Cl, Br, and I. In addition, in Composition formula (4), d satisfies $0 < d < 2$.

Regarding the negative electrode material according to the first embodiment, in the case in which the halide solid electrolyte material satisfies Formula (4), the negative electrode material according to the first embodiment can improve the cycle characteristics of the battery and, in addition, can also improve the charge-discharge efficiency of the battery. Further, since the halide solid electrolyte material that satisfies Formula (4) has high ionic conductivity, a halide reduced form can be efficiently generated.

The halide solid electrolyte material according to the first embodiment may be a material denoted by Formula (5) below.

$$Li_3YX_6 \quad \text{Formula (5)}$$

Herein, in Composition formula (5), X represents at least two elements selected from the group consisting of Cl, Br, and I. That is, in Composition formula (4) above, d may be 1.

Regarding the negative electrode material according to the first embodiment, in the case in which the halide solid electrolyte material satisfies Formula (5), the negative electrode material according to the first embodiment can improve the cycle characteristics of the battery and, in addition, can also improve the charge-discharge efficiency of the battery. Further, since the halide solid electrolyte material that satisfies Formula (5) has high ionic conductivity, a halide reduced form can be efficiently generated.

The halide solid electrolyte material according to the first embodiment may be a material denoted by Composition formula (6) below.

$$Li_{3-3\delta}Y_{1+\delta}Cl_6 \quad \text{Formula (6)}$$

Herein, in Composition formula (6), $0<\delta\leq0.15$ is satisfied.

Regarding the negative electrode material according to the first embodiment, in the case in which the halide solid electrolyte material satisfies Formula (6), the negative electrode material according to the first embodiment can improve the cycle characteristics of the battery and, in addition, can also improve the charge-discharge efficiency of the battery. Further, since the halide solid electrolyte material that satisfies Formula (6) has high ionic conductivity, a halide reduced form can be efficiently generated.

The halide solid electrolyte material according to the first embodiment may be a material denoted by Composition formula (7) below.

$$Li_{3-3\delta}Y_{1+\delta}Br_6 \quad \text{Formula (7)}$$

Herein, in Composition formula (7), $0<\delta\leq0.25$ is satisfied.

Regarding the negative electrode material according to the first embodiment, in the case in which the halide solid electrolyte material satisfies Formula (7), the negative electrode material according to the first embodiment can improve the cycle characteristics of the battery and, in addition, can also improve the charge-discharge efficiency of the battery. Further, since the halide solid electrolyte material that satisfies Formula (7) has high ionic conductivity, a halide reduced form can be efficiently generated.

The halide solid electrolyte material in the first embodiment may be a material denoted by Composition formula (8) below.

$$Li_{3-3\delta+a}Y_{1+\delta-a}Me_aCl_{6-x-y}Br_xI_y \quad \text{Formula (8)}$$

Herein, in Composition formula (8), Me represents at least one element selected from the group consisting of Mg, Ca, Sr, Ba, and Zn. Further, in Composition formula (8),
$-1<\delta<2$,
$0<a<3$,
$0<(3-3\delta+a)$,
$0<(1+\delta-a)$
$0\leq x\leq 6$,
$0\leq y\leq 6$, and
$(x+y)\leq 6$
are satisfied.

Regarding the negative electrode material according to the first embodiment, in the case in which the halide solid electrolyte material satisfies Formula (8), the negative electrode material according to the first embodiment can improve the cycle characteristics of the battery and, in addition, can also improve the charge-discharge efficiency of the battery. Further, since the halide solid electrolyte material that satisfies Formula (8) has high ionic conductivity, a halide reduced form can be efficiently generated.

The halide solid electrolyte material in the first embodiment may be a material denoted by Composition formula (9) below.

$$Li_{3-3\delta}Y_{1+\delta-a}Me_aCl_{6-x-y}Br_xI_y \quad \text{Formula (9)}$$

Herein, in Composition formula (9), Me represents at least one element selected from the group consisting of Al, Sc, Ga, and Bi. Further, in Composition formula (9),
$1<\delta<1$,
$0<a<2$,
$0<(1+\delta-a)$
$0\leq x\leq 6$,
$0\leq y\leq 6$, and
$(x+y)\leq 6$
are satisfied.

Regarding the negative electrode material according to the first embodiment, in the case in which the halide solid electrolyte material satisfies Formula (9), the negative electrode material according to the first embodiment can improve the cycle characteristics of the battery and, in addition, can also improve the charge-discharge efficiency of the battery. Further, since the halide solid electrolyte material that satisfies Formula (9) has high ionic conductivity, a halide reduced form can be efficiently generated.

The halide solid electrolyte material in the first embodiment may be a material denoted by Composition formula (10) below.

$$Li_{3-3\delta-a}Y_{1+\delta-a}Me_aCl_{6-x-y}Br_xI_y \quad \text{Formula (10)}$$

Herein, in Composition formula (10), Me represents at least one element selected from the group consisting of Zr, Hf, and Ti. Further, in Composition formula (10),
$-1<\delta<1$,
$0<a<1.5$,
$0<(3-3\delta-a)$,
$0<(1+\delta-a)$
$0\leq x\leq 6$,
$0\leq y\leq 6$, and
$(x+y)\leq 6$
are satisfied.

Regarding the negative electrode material according to the first embodiment, in the case in which the halide solid electrolyte material satisfies Formula (10), the negative electrode material according to the first embodiment can improve the cycle characteristics of the battery and, in addition, can also improve the charge-discharge efficiency of the battery. Further, since the halide solid electrolyte material that satisfies Formula (10) has high ionic conductivity, a halide reduced form can be efficiently generated.

The halide solid electrolyte material in the first embodiment may be a material denoted by Composition formula (11) below.

$$Li_{3-3\delta-2a}Y_{1+\delta-a}Me_aCl_{6-x-y}Br_xI_y \quad \text{Formula (11)}$$

Herein, in Composition formula (11), Me represents at least one element selected from the group consisting of Ta and Nb. Further, in Composition formula (11), $-1<\delta<1$,
$0<a<1.2$,
$0<(3-3\delta-2a)$,
$0<(1+\delta-a)$
$0 \leq x \leq 6$,
$0 \leq y \leq 6$, and
$(x+y) \leq 6$
are satisfied.

Regarding the negative electrode material according to the first embodiment, in the case in which the halide solid electrolyte material satisfies Formula (11), the negative electrode material according to the first embodiment can improve the cycle characteristics of the battery and, in addition, can also improve the charge-discharge efficiency of the battery. Further, since the halide solid electrolyte material that satisfies Formula (11) has high ionic conductivity, a halide reduced form can be efficiently generated.

Specific examples of the halide solid electrolyte material in the first embodiment include $Li_{2.7}Y_{1.1}Cl_6$, $Li_3YBr_3Cl_3$, $Li_3YBr_6$, $Li_{2.5}Zr_{0.5}Y_{0.5}Cl_6$, $Li_3YBr_2Cl_2I_2$, $Li_{3.1}Y_{0.9}Ca_{0.1}Cl_6$, $Li_3Y_{0.8}Al_{0.2}Cl_6$, $Li_{2.5}Y_{0.5}Hf_{0.5}Cl_6$, $Li_{2.8}Y_{0.9}Ta_{0.1}Cl_6$, $Li_{4.5}Y_{0.475}Bi_{0.025}Cl_6$, and $Li_{1.5}Y_{1.425}Bi_{0.075}Cl_6$.

Regarding the negative electrode material according to the first embodiment, in the case in which the halide solid electrolyte material is the material described above as an example, the negative electrode material according to the first embodiment can improve the cycle characteristics of the battery and, in addition, can also improve the charge-discharge efficiency of the battery. Further, since the material described above as an example has high ionic conductivity, a halide reduced form can be efficiently generated.

Regarding the halide solid electrolyte material in the first embodiment, other than the above-described materials, for example, known solid electrolyte materials that satisfy Formula (1) above may be used.

Regarding the halide reduced form in the first embodiment, in an X-ray diffraction pattern obtained by X-ray diffraction measurement in which the Cu—Kα ray is used as a radiation source, a peak top may be present at the value of the diffraction angle 2θ within the range of greater than or equal to θa and less than or equal to θb.

Herein, θb is a value of the diffraction angle 2θ of the peak top of a peak reflecting the (220) face of LiX composed of halogen (that is, X) contained in the halide reduced form and Li. The peak of the (220) face of LiX is a peak of the (220) face expressed in Miller index hkl of a rock-salt-type structure having a crystal structure belonging to space group Fm-3m of LiCl, LiBr, LiI, or the like. In this regard, in the case in which at least two types of halogens are contained in the halide reduced form, a halogen having a smaller atomic number is selected as the halogen for determining θb.

Meanwhile, θa is a value of the diffraction angle 2θ of the peak top of a peak derived from the halide solid electrolyte material and is a value closest to θb above.

According to the above-described configuration, the negative electrode material according to the first embodiment can further improve the cycle characteristics of the battery. Specifically, the peak derived from the halide reduced form shifts from θa to θb in accordance with Li occlusion. On the other hand, the peak derived from the halide reduced form shifts from θb to θa in accordance with Li release. It is considered that the crystal structure of the halide reduced form shrinks and expands in accordance with Li occlusion and Li release. Therefore, it is conjectured that the negative electrode material containing the halide reduced form improves the cycle characteristics of the battery.

The negative electrode material in the first embodiment may contain materials other than the halide reduced form. The negative electrode material in the first embodiment may contain, for example, a negative electrode active material, a solid electrolyte material, a binder, and a conductive auxiliary. Regarding the binder, materials described as examples of a binder contained in at least one of a negative electrode, an electrolyte layer, and a positive electrode in a second embodiment described later may be used. Regarding the binder, materials described as examples of a binder contained in at least one of a negative electrode, an electrolyte layer, and a positive electrode in a second embodiment described later may be used. Regarding the conductive auxiliary, materials described as examples of a conductive auxiliary contained in at least one of the negative electrode and the positive electrode in the second embodiment described later may be used.

The negative electrode material in the first embodiment may contain a negative electrode active material that has characteristics of occluding and releasing metal ions (for example, lithium ions). Regarding the negative electrode active material, for example, metal materials, carbon materials, oxides, nitrides, tin compounds, and silicon compounds may be used. The metal materials may be simple metals. Alternatively, the metal materials may be alloys. Examples of the metal materials include lithium metal and lithium alloys, Examples of the carbon materials include natural graphite, coke, graphitizing carbon, carbon fibers, spherical carbon, artificial graphite, and amorphous carbon.

The negative electrode material in the first embodiment may contain a solid electrolyte material that has characteristics of conducting metal ions (for example, lithium ions). Regarding the solid electrolyte material, for example, halide solid electrolyte materials, sulfide solid electrolyte materials, oxide solid electrolyte materials, polymer solid electrolyte materials, and complex hydride solid electrolyte materials may be used.

According to the above-described configuration, since the ionic conductivity inside the negative electrode is enhanced, a battery that can operate with a high output can be realized.

Regarding the halide solid electrolyte materials, the same halide solid electrolyte material as the halide solid electrolyte material that is before being reduced to the halide reduced form contained in the negative electrode material according to the first embodiment may be used, or other halide solid electrolyte materials different from the above may be used.

Regarding the sulfide solid electrolyte materials, $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$, and the like may be used. Further, LiX (X: F, Cl, Br, or I), $Li_2O$, $Li_pMO_q$ (M: at least one selected from the group consisting of P, Si, Ge, B, Al, Ga, In, Fe, and Zn) (p, q: a natural number), and the like may be added to them.

Regarding the oxide solid electrolyte materials, for example, NASICON-type solid electrolyte materials represented by $LiTi_2(PO_4)_3$ and element substitution products thereof, $(LaLi)TiO_3$-based perovskite-type solid electrolyte materials, LISICON-type solid electrolyte materials represented by $Li_{14}ZnGe_4O_{16}$, $Li_4SiO_4$, and $LiGeO_4$ and element substitution products thereof, garnet-type solid electrolyte materials represented by $Li_7La_3Zr_2O_{12}$ and element substitution products thereof, $Li_3N$ and H substitution products thereof, $Li_3PO_4$ and N substitution products thereof, glass in which a Li—B—O compound such as $LiBO_2$ or $Li_3BO_3$ serves as a base and $Li_2SO_4$, $Li_2CO_3$, or the like is added thereto, and glass ceramic may be used.

Regarding the polymer solid electrolyte materials, for example, compounds of polymer compounds and lithium salts may be used. The polymer compound may have an ethylene oxide structure. Having an ethylene oxide structure enables a large amount of lithium salt to be contained and enables the ionic conductivity to be further enhanced, Regarding the lithium salts, $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, $LiC(SO_2CF_3)_3$, and the like may be used. At least one lithium salt selected from these may be used alone as the lithium salt. Alternatively, mixtures of at least two lithium salts selected from these may be used as the lithium salt.

Regarding the complex hydride solid electrolyte materials, for example, $LiBH_4$—$LiI$ and $LiBH_4$—$P_2S_5$ may be used.

The negative electrode material in the first embodiment may contain, for example, greater than or equal to 30% by mass of halide reduced form or may contain greater than or equal to 80% by mass. The negative electrode material in the first embodiment may be composed of the halide reduced form alone. The negative electrode material containing greater than or equal to 30% by mass of halide reduced form enables the energy density of the battery to be sufficiently ensured.

According to the above-described configuration, the negative electrode material in the first embodiment can improve the cycle characteristics of the battery.

There is no particular limitation regarding the shape of the halide reduced form in the first embodiment. The shape of the halide reduced form may be, for example, the shape of a needle, a sphere, or an elliptical sphere. For example, the shape of the halide reduced form may be particulate.

There is no particular limitation regarding the method for producing the halide reduced form, and a known method in which a halide solid electrolyte material can be reduced may be used. Examples of the method include an electrochemical technique. For example, an electrochemical cell in which a Li-containing compound is used for the counter electrode and a halide solid electrolyte material is used for a working electrode is prepared. Production can be performed by applying a constant current to the resulting cell so as to reduce the halide solid electrolyte material of the working electrode. The negative electrode material in the first embodiment can be produced by mixing the resulting halide reduced form with other substances as the situation demands or can be produced by using the resulting halide reduced form.

Second Embodiment

A second embodiment will be described below. The same explanations as for the first embodiment above are appropriately omitted.

Figure 1:
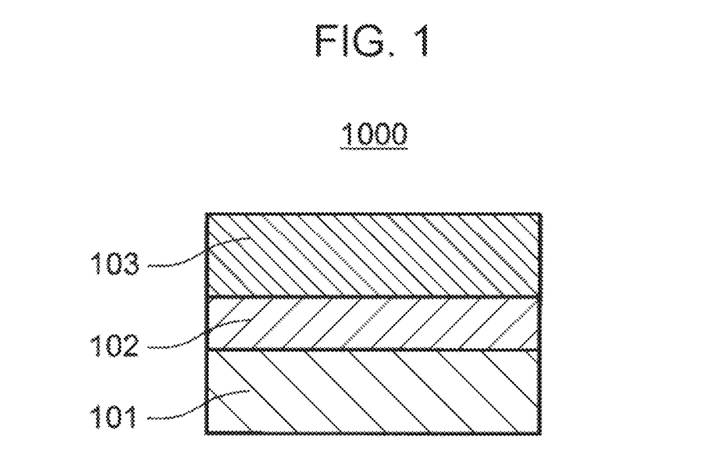
FIG. 1 is a schematic sectional view illustrating the configuration of a battery 1000 that is an example of a battery in a second embodiment.

FIG. 1 is a schematic sectional view illustrating the configuration of a battery in the second embodiment.

A battery 1000 according to the second embodiment includes a negative electrode 101, an electrolyte layer 102, and a positive electrode 103.

The negative electrode 101 contains the negative electrode material in the first embodiment.

The electrolyte layer 102 is arranged between the negative electrode 101 and the positive electrode 103.

According to the above-described configuration, the cycle characteristics of the battery according to the second embodiment can be improved.

In this regard, the negative electrode 101 may be composed of just the negative electrode material in the first embodiment.

According to the above-described configuration, the cycle characteristics of the battery according to the second embodiment can be further improved.

The negative electrode 101 may contain a negative electrode active material that has characteristics of occluding and releasing metal ions (for example, lithium ions). The material usable as the negative electrode active material is the same as the material described as the negative electrode active material that may be contained in the negative electrode material in the first embodiment.

The negative electrode 101 may contain a solid electrolyte material that has characteristics of conducting metal ions (for example, lithium ions). The material usable as the solid electrolyte material is the same as the material described as the solid electrolyte material that may be contained in the negative electrode material in the first embodiment.

According to the above-described configuration, since the ionic conductivity inside the negative electrode is enhanced, the operation with a high output can be made possible.

The thickness of the negative electrode 101 may be greater than or equal to 10 μm and less than or equal to 500 μm. Setting the thickness of the negative electrode to be greater than or equal to 10 μm enables a sufficient energy density to be ensured. Meanwhile, setting the thickness of the negative electrode to be less than or equal to 500 μm facilitates the operation with a high output. That is, the thickness of the negative electrode 101 being appropriately adjusted enables the energy density of the battery to be sufficiently ensured and enables the battery to operate with a high output.

The electrolyte layer 102 is a layer containing an electrolyte material. The electrolyte material is, for example, a solid electrolyte material. That is, the electrolyte layer 102 may be a solid electrolyte layer. Regarding the solid electrolyte material contained in the electrolyte layer 102, the solid electrolyte materials described as examples of the solid electrolyte material that may be contained in the negative electrode material in the first embodiment may be used.

In this regard, the electrolyte layer 102 may contain the solid electrolyte material as a primary component. That is, the electrolyte layer 102 may contain, for example, greater than or equal to 50% in terms of mass ratio (greater than or equal to 50% by mass) of solid electrolyte material relative to the total of the electrolyte layer 102.

According to the above-described configuration, the charge-discharge characteristics of the battery can be further improved.

In addition, the electrolyte layer 102 may contain, for example, greater than or equal to 70% in terms of mass ratio (greater than or equal to 70% by mass) of solid electrolyte material relative to the total of the electrolyte layer 102.

According to the above-described configuration, the charge-discharge characteristics of the battery can be further improved.

In this regard, the electrolyte layer 102 may contain the solid electrolyte material as a primary component while further containing incidental impurities or starting raw materials used for synthesizing the solid electrolyte material and byproducts, decomposition products, and the like.

Meanwhile, the electrolyte layer 102 may contain, for example, 100% in terms of mass ratio (100% by mass) of solid electrolyte material relative to the total of the electrolyte layer 102 except incidentally included impurities.

According to the above-described configuration, the charge-discharge characteristics of the battery can be further improved.

As described above, the electrolyte layer 102 may be composed of the solid electrolyte material alone.

In this regard, the electrolyte layer 102 may contain at least two of materials listed as the solid electrolyte materials. For example, the electrolyte layer 102 may contain the halide solid electrolyte material and the sulfide solid electrolyte material.

The thickness of the electrolyte layer 102 may be greater than or equal to 1 μm and less than or equal to 300 μm. In the case in which the thickness of the electrolyte layer 102 is greater than or equal to 1 μm, there is a low possibility of a short circuit occurring between the negative electrode 101 and the positive electrode 103. Meanwhile, in the case in which the thickness of the electrolyte layer 102 is less than or equal to 300 μm, the operation with a high output is facilitated. That is, the thickness of the electrolyte layer 102 being appropriately adjusted enables sufficient safety of the battery to be ensured and enables the battery to operate with a high output.

The positive electrode 103 contains positive electrode active material particles and solid electrolyte particles.

The positive electrode 103 contains a positive electrode active material that has characteristics of occluding and releasing metal ions (for example, lithium ions). Regarding the positive electrode active material, lithium-containing transition metal oxides, transition metal fluorides, polyanion materials, fluorized polyanion materials, transition metal sulfides, transition metal oxysulfides, transition metal oxynitrides, and the like may be used. In particular, using the lithium-containing transition metal oxide as the positive electrode active material enables the production cost to be reduced and enables the average discharge voltage to be increased. Examples of the lithium-containing transition metal oxides include $Li(NiCoAl)O_2$, $Li(NiCoMn)O_2$, and $LiCoO_2$.

The positive electrode 103 may contain the solid electrolyte material. Regarding the solid electrolyte material, the solid electrolyte materials described as examples of the solid electrolyte material that may be contained in the negative electrode material in the first embodiment may be used. According to the above-described configuration, the lithium ion conductivity inside the positive electrode 103 is enhanced and the operation with a high output is made possible.

The median diameter of the positive electrode active material particles may be greater than or equal to 0.1 μm and less than or equal to 100 μm. In the positive electrode, the median diameter of the positive electrode active material particles being greater than or equal to 0.1 μm enables the positive electrode active material particles and the solid electrolyte material to form a favorable dispersion state. Consequently, the charge-discharge characteristics of the battery are improved. Meanwhile, the median diameter of the positive electrode active material particles being less than or equal to 100 μm accelerates lithium diffusion in the positive electrode active material particles. Consequently, the operation of the battery with a high output is facilitated. That is, the positive electrode active material particles having an appropriate size enables the battery having excellent charge-discharge characteristics and being capable of operating with a high output to be obtained. In this regard, in the present specification, the median diameter of particles denotes a particle diameter at a cumulative volume of 50% (d50) that is determined from grain size distribution measured by a laser diffraction scattering method on a volume basis.

The median diameter of the positive electrode active material particles may be greater than the median diameter of the solid electrolyte material. Consequently, the positive electrode active material particles and the solid electrolyte material can form a favorable dispersion state.

Regarding the volume ratio "v:(100−v)" of the positive electrode active material particles to the solid electrolyte material contained in the positive electrode 103 (where v represents the volume ratio of the positive electrode active material particles), $30 \leq v \leq 95$ may be satisfied. In the case in which $30 \leq v$ applies, a sufficient energy density of the battery can be ensured. Meanwhile, in the case in which $v \leq 95$ applies, the operation of the battery with a high output is facilitated.

The thickness of the positive electrode 103 may be greater than or equal to 10 μm and less than or equal to 500 μm. The thickness of the positive electrode being greater than or equal to 10 μm enables a sufficient energy density of the battery to be ensured. Meanwhile, the thickness of the positive electrode being less than or equal to 500 μm enables the battery to operate with a high output. That is, the thickness of the positive electrode 103 being adjusted to within an appropriate range enables the energy density of the battery to be sufficiently ensured and enables the battery to operate with a high output.

A binder may be contained in at least one of the negative electrode 101, the electrolyte layer 102, and the positive electrode 103. The binder being contained enables the adhesiveness between particles to be improved. The binder is used to improve the binding properties of the materials constituting the electrode. Examples of the binder include polyvinylidene fluorides, polytetrafluoroethylenes, polyethylenes, polypropylenes, aramid resins, polyamides, polyimides, polyamide-imides, polyacrylonitriles, polyacrylic acids, polyacrylic acid methyl esters, polyacrylic acid ethyl esters, polyacrylic acid hexyl esters, polymethacrylic acids, polymethacrylic acid methyl esters, polymethacrylic acid ethyl esters, polymethacrylic acid hexyl esters, polyvinyl acetates, polyvinyl pyrrolidones, polyethers, polyether sulfones, hexafluoropolypropylenes, styrene-butadiene rubber, and carboxymethyl cellulose. In addition, regarding the binder, copolymers of at least two materials selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene may be used. At least two selected from these may be mixed and used as the binder.

At least one of the negative electrode 101 and the positive electrode 103 may contain a conductive auxiliary. The conductive auxiliary being contained enables the electron conductivity to be enhanced. Regarding the conductive auxiliary, for example, graphite such as natural graphite and artificial graphite, carbon black such as acetylene black and ketjenblack, conductive fibers such as carbon fibers and metal fibers, carbon fluoride, metal powders such as aluminum, conductive whiskers such as zinc oxide and potassium titanate, conductive metal oxides such as titanium oxide, and conductive polymer compounds such as polyanilines, polypyrroles, and polythiophenes may be used. In the case in which carbon conductive auxiliaries are used, the cost can be reduced.

Incidentally, the battery in the second embodiment may be constructed as batteries having various types of shapes such as a coin type, a cylindrical type, a square type, a sheet type, a button type, a flat type, a stacked type, and the like.

There is no particular limitation regarding the operation temperature of the battery, and the temperature may be −50° C. to 100° C. Higher temperature enables the ionic conductivity of the halide reduced form to be improved and enables the operation with a high output to be facilitated.

The battery in the second embodiment may be produced by, for example, preparing each of a material for forming the positive electrode, a material for forming the electrolyte layer, and a material for forming the negative electrode and producing a multilayer body in which the positive electrode, the electrolyte layer, and the negative electrode are arranged in this order by using a known method.

Regarding other production methods, for example, the following method can also be used.

Initially, a multilayer body in which the positive electrode, a solid electrolyte layer containing the halide solid electrolyte material in the state before being reduced to the halide reduced form contained in the negative electrode material in the first embodiment, and a negative electrode collector are arranged in this order is produced. In the multilayer body, the solid electrolyte layer and the negative electrode collector are in contact with each other. The solid electrolyte layer produced by this production method may be composed of the halide solid electrolyte material alone or may further contain other solid electrolyte materials.

Subsequently, a constant current is applied to the resulting multilayer body. In this case, the positive electrode functions as the counter electrode, and the solid electrolyte material that is contained in the solid electrolyte layer and that is in the vicinity of the negative electrode collector functions as the working electrode so as to reduce the solid electrolyte material in the vicinity of the negative electrode collector. Consequently, the battery in the second embodiment including the positive electrode, the negative electrode containing the halide reduced form, and the electrolyte layer disposed between the positive electrode and the negative electrode.

That is, an example of the method for producing the battery according to the second embodiment includes producing a multilayer body in which the positive electrode, the solid electrolyte layer containing the halide solid electrolyte material in the state before being reduced to the halide reduced form contained in the negative electrode material in the first embodiment, and the negative electrode collector are arranged in this order and in which the solid electrolyte layer is in contact with the negative electrode collector; and applying a current to the multilayer body.

EXAMPLE

The present disclosure will be described below in detail with reference to the examples and the comparative example. In this regard, the negative electrode material and the battery according to the present disclosure are not limited to the following examples.

Example 1

Production of Halide Solid Electrolyte Material

In an argon glove box at a dew point of lower than or equal to −60° C., LiCl and YCl$_3$ serving as raw material powders were weighed at a molar ratio of LiCl:YCl$_3$=2.7:1.1. Thereafter, these raw material powders were mixed, and the resulting mixture was subjected to milling treatment for 25 hours at 600 rpm by using a planetary ball mill (Model P-5 produced by Fritsch). In this manner, a powder of the halide solid electrolyte material Li$_{2.7}$Y$_{1.1}$Cl$_6$ (hereafter referred to as "LYC") was obtained.

Production of Sulfide Solid Electrolyte Material

In an argon glove box at a dew point of lower than or equal to −60° C., Li$_2$S and P$_2$S$_5$ serving as raw material powders were weighed at a molar ratio of Li$_2$S:P$_2$S$_5$=75:25. These raw material powders were pulverized in a mortar and mixed. Thereafter, the resulting mixture was subjected to milling treatment for 10 hours at 510 rpm by using a planetary ball mill (Model P-7 produced by Fritsch), The resulting glass-like solid electrolyte was heat-treated in an inert atmosphere at 270° C. for 2 hours. In this manner, a glass-ceramic-like solid electrolyte material Li$_2$S—P$_2$S$_5$ (hereafter referred to as "LPS") was obtained.

Production of Halide Reduced Form

A halide reduced form was produced by using an electrochemical cell produced on the basis of the following method.

Initially, in an insulating outer cylinder, 0.44 mol of LPS and 0.022 mol of LYC were stacked in this order. This was subjected to pressure forming at a pressure of 370 MPa so as to obtain an LPS-LYC multilayer body. A working electrode composed of LYC was obtained by arranging a stainless steel pin on LYC in the multilayer body.

Subsequently, an In—Li ahoy was produced by stacking an In metal (thickness of 200 μm), a Li metal (thickness of 300 μm), and an In metal (thickness of 200 μM) in this order to come into contact with LPS in the multilayer body and by subjecting this to pressure forming at a pressure of 80 MPa. An In—Li alloy reference-cum-counter electrode was obtained by arranging a stainless steel pin on the In—Li alloy. Consequently, a bipolar electrochemical cell composed of SUS|LYC|LPS|In—Li alloy was obtained.

Thereafter, the inside of the insulating outer cylinder was cut off from the external atmosphere and hermetically sealed by using an insulating ferrule.

Finally, a surface pressure of 150 MPa was applied to the electrochemical cell by vertically constraining the electrochemical cell with four volts.

In this manner, the electrochemical cell in Example 1 was produced.

The reduced form of LYC (hereafter referred to as "red-LYC") was produced under the following condition by using the above-described electrochemical cell.

The electrochemical cell was placed in a constant temperature bath at 70° C. Thereafter, a working electrode obtained by applying a current to the electrochemical cell at a current density of current value 0.1 mA/cm$^2$ and by completing the application of the current when an amount of the current applied reached 1 electron per LYC molecule was taken as a red-LYC (1e charge) sample, and a working electrode obtained by completing the application of the current when an amount of the current applied reached 2 electrons per LYC molecule was taken as a red-LYC (2e charge) sample. In addition, a current was applied to the electrochemical cell at a current density of current value 0.1 mA/cm$^2$ so as to lower the potential of a working electrode to −0.6 V (vs LiIn), and the resulting working electrode was taken as a red-LYC (full charge) sample.

Figure 2:
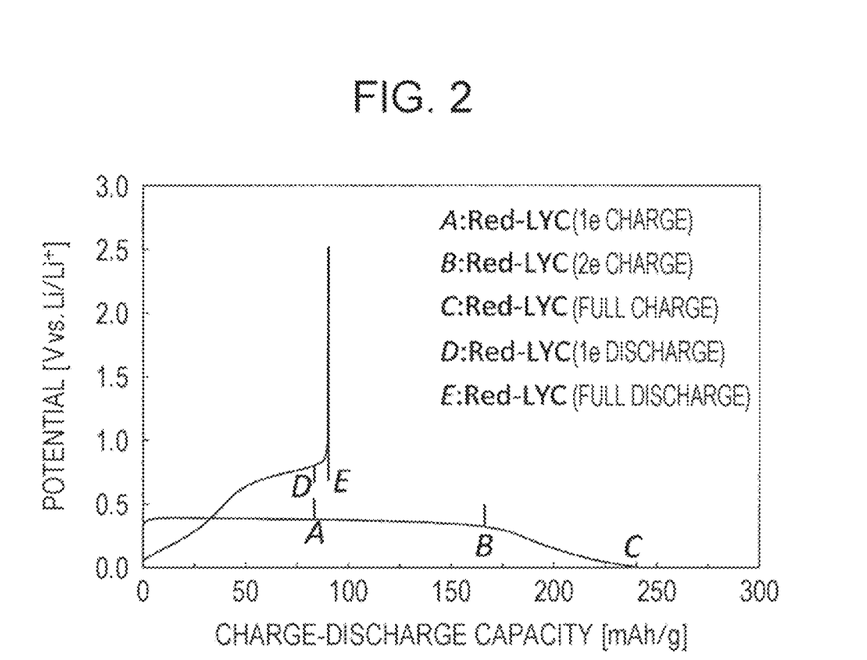
FIG. 2 is a diagram illustrating a charge-discharge curve of the reduced form in Example 1.

Meanwhile, a current was applied to the electrochemical cell at a current density of current value 0.1 mA/cm$^2$ so as to lower the potential of a working electrode to −0.6 V (vs LiIn), a current was applied in the opposite direction at a current density of current value 0.1 mA/cm$^2$, the application of the current was completed when an amount of the current applied reached 1 electron per LYC molecule, and the resulting working electrode was taken as a red-LYC (1e discharge) sample. In addition, a current was applied to the electrochemical cell at a current density of current value 0.1 mA/cm² so as to lower the potential of a working electrode to −0.6 V (vs LiIn), a current was applied in the opposite direction at a current density of current value 0.1 mA/cm² so as to increase the potential of the working electrode to 1.9 V (vs LiIn), and the resulting working electrode was taken as a red-LYC (full discharge) sample. The charge-discharge curve of each red-LYC is illustrated in FIG. 2. In this regard, in FIG. 2, the measured potential of the working electrode was converted to a potential on a Li/Li⁺ basis by adding the potential at 70° C. of the In—Li alloy (0.6 V vs).

X-Ray Diffraction (XRD) Pattern of Halide Reduced Form

Figure 3:
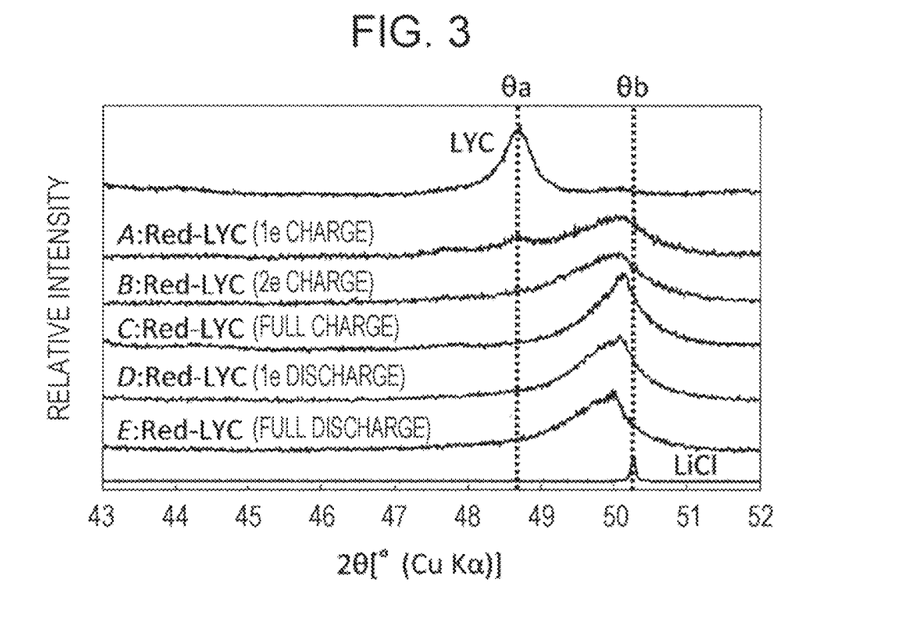
FIG. 3 is a diagram illustrating X-ray diffraction patterns of the reduced form in Example 1.

FIG. 3 is a graph illustrating XRD patterns of red-LYC, The results illustrated in FIG. 3 are on the basis of the measurement by using the following method.

A fully automatic multipurpose X-ray diffraction system (SmartLab produced by Rigaku Corporation) was used, and an XRD pattern of red-LYC was measured in a dry environment at a dew point of lower than or equal to −50° C. The Cu—K$\alpha$1 ray was used as the X-ray source. That is, the Cu—K$\alpha$ ray (wavelength of 1.5405 Å, i.e. 0.15405 nm) was used as the X-ray, and an XRD pattern was measured by using the $\theta$-2$\theta$ method.

Each of the peak tops of the XRD peaks of red-LYC was present between the peak top position of the XRD peak derived from LYC (that is, the position of $\theta$a) and the peak top position of the peak of LiCl (that is, the position of $\theta$b). In this regard, the peak of LiCl illustrated in FIG. 3 is on the basis of the data (ICSD No. 26909) included in the inorganic crystal structure database (ICSD).

Production of Secondary Battery

In an argon glove box, LYC and Li(NiCoMn)O₂ were weighed at a weight ratio of 30:70. These were mixed in an agate mortar so as to produce a positive electrode material.

In an insulating outer cylinder, 12 mg of positive electrode material and 80 mg of LYC were stacked in this order. This was subjected to pressure forming at a pressure of 370 MPa so as to obtain a positive-electrode-LYC multilayer body. A working electrode composed of LYC and a counter electrode serving as a positive electrode were obtained by arranging a stainless steel pin on each of the positive electrode and LYC. The inside of the insulating outer cylinder was cut off from the external atmosphere and hermetically sealed by using an insulating ferrule.

Finally, a surface pressure of 150 MPa was applied to the multilayer body by vertically constraining the multilayer body with four volts.

In this manner, the secondary battery in Example 1 was produced.

The resulting battery was placed in a constant temperature bath at 25° C. The voltage of the resulting battery was increased to 4.2 V by applying a current at a current density of current value 0.1 mA/cm² so as to reduce LYC constituting a reference electrode and to produce a secondary battery composed of positive electrode|LYC|red-LYC.

Example 2

Production of Halide Solid Electrolyte Material

In an argon glove box at a dew point of lower than or equal to −60° C., LiBr and YCl₃ serving as raw material powders were weighed at a molar ratio of LiBr:YCl₃=3:1. Thereafter, these raw material powders were mixed, and the resulting mixture was heat-treated for 12 hours at 460° C. by using an electric furnace. In this manner, a powder of the halide solid electrolyte material Li₃YBr₃Cl₃ (hereafter referred to as "LYBC") was obtained.

Production of Halide Reduced Form

Figure 4:
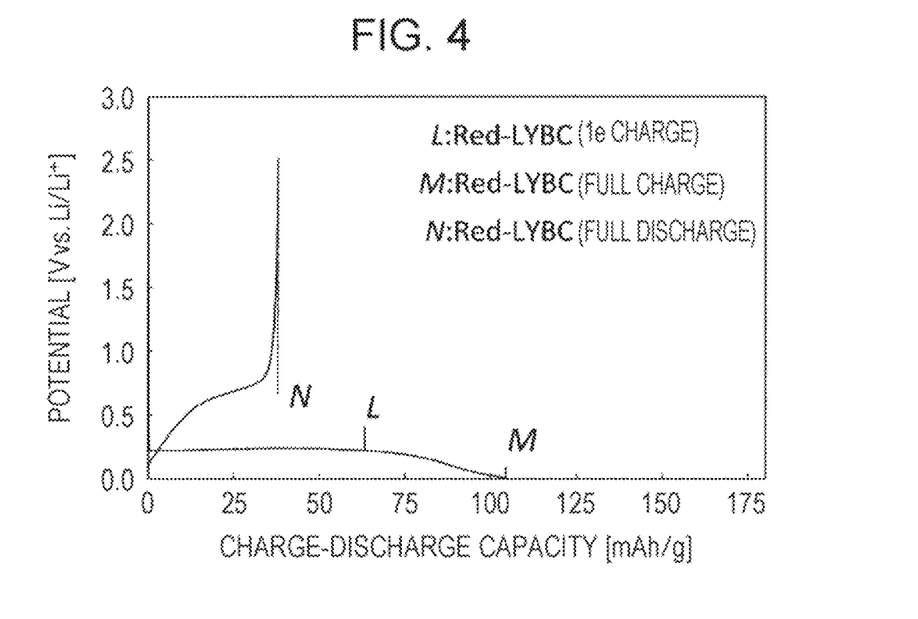
FIG. 4 is a diagram illustrating a charge-discharge curve of a reduced form in Example 2.

An electrochemical cell was produced in the same manner as in Example 1 except that LYBC was used as the halide solid electrolyte material, Regarding production of a reduced form of LYBC (hereafter referred to as "red-LBC"), each of red-LYBC (1e charge), red-LYBC (full charge), and red-LYBC (full discharge) was obtained in the same manner as in Example 1, The charge-discharge curve of each red-LYBC is illustrated in FIG. 4. In this regard, FIG. 4 illustrates a potential on a Li/Li⁺ basis as in FIG. 2.

X-Ray Diffraction (XRD) Pattern of Halide Reduced Form

Figure 5:
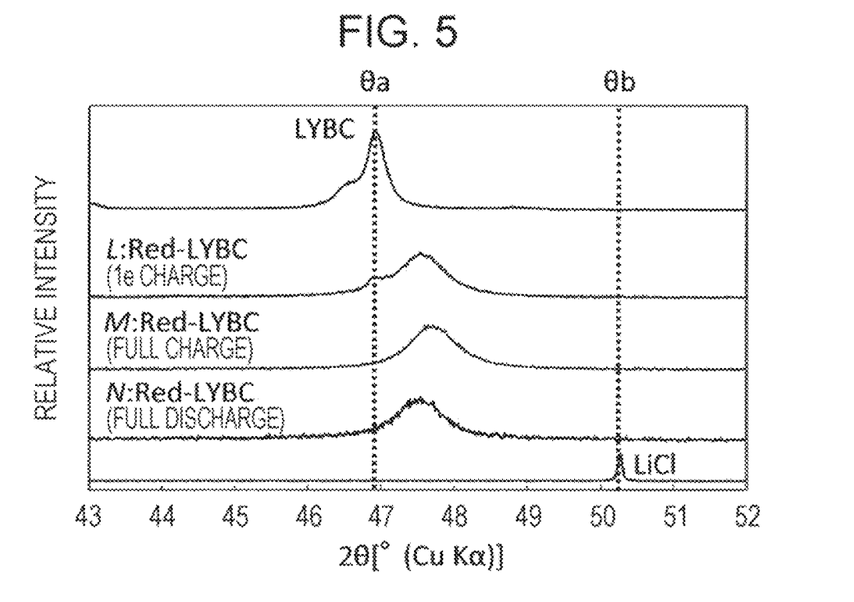
FIG. 5 is a diagram illustrating X-ray diffraction patterns of the reduced form in Example 2.

FIG. 5 is a graph illustrating XRD patterns of red-LYBC. The results illustrated in FIG. 5 are on the basis of the measurement by using the same method as in Example 1.

Each of the peak tops of the XRD peaks of red-LYBC was present between the peak top position of the XRD peak derived from LYBC (that is, the position of $\theta$a) and the peak top position of the peak of LiCl (that is, the position of $\theta$b), In this regard, red-LYBC that is the halide reduced form in Example 2 contains two types of halogens, Cl and Br, Therefore, Cl having a smaller atomic number is selected as the halogen for determining $\theta$b, and the peak top position of the peak of the (220) face of LiCl is set to be $\theta$b. In this regard, the peak of LiCl illustrated in FIG. 5 is on the basis of the data (ICSD No. 26909) included in the inorganic crystal structure database (ICSD), Production of Secondary Battery A secondary battery composed of positive electrode-|LYBC|red-LYBC was produced in the same manner as in Example 1 except that LYBC was used as the halide solid electrolyte material.

Example 3

Production of Halide Solid Electrolyte Material

Figure 6:
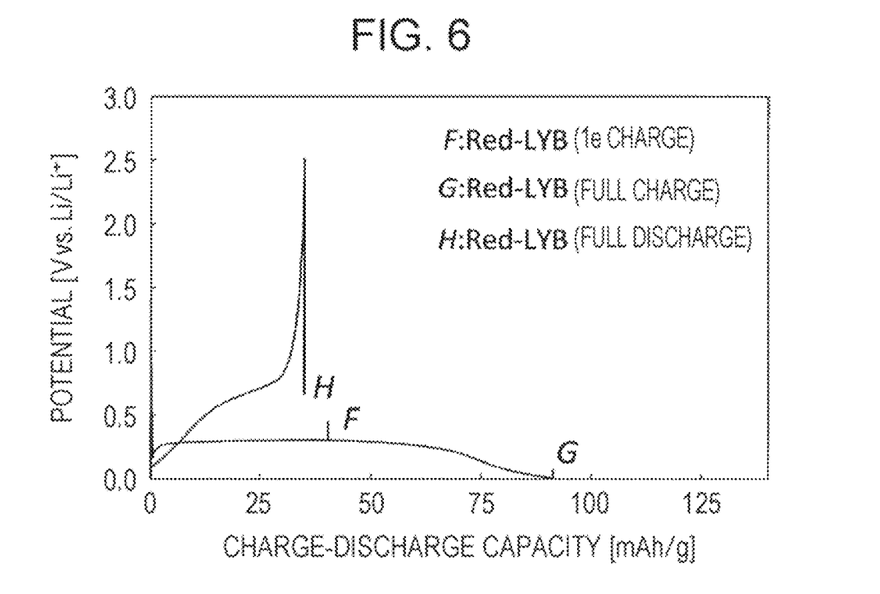
FIG. 6 is a diagram illustrating a charge-discharge curve of a reduced form in Example 3.

In an argon glove box at a dew point of lower than or equal to −60° C., LiBr and YBr₃ serving as raw material powders were weighed at a molar ratio of LiBr:YBr₃=3:1. Thereafter, these raw material powders were mixed, and the resulting mixture was subjected to milling treatment for 25 hours at 600 rpm by using a planetary ball mill (Model P-5 produced by Fritsch). In this manner, a powder of a halide solid electrolyte material Li₃YBr₆ (hereafter referred to as "LYB") was obtained, Production of Halide Reduced Form An electrochemical cell was produced in the same manner as in Example 1 except that LYB was used as the halide solid electrolyte material, Regarding production of a reduced form of LYB (hereafter referred to as "red-LYB"), each of red-LYB (1e charge), red-LYB (full charge), and red-LYB (full discharge) was obtained in the same manner as in Example 1. The charge-discharge curve of each red-LYB is illustrated in FIG. 6. In this regard, FIG. 6 illustrates a potential on a Li/Li⁺ basis as in FIG. 2.

X-ray diffraction (XRD) pattern of halide reduced form

Figure 7:
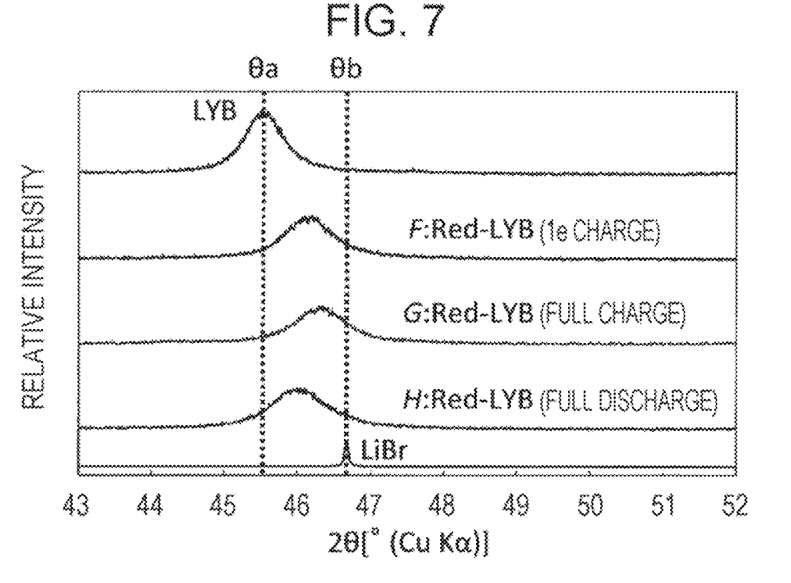
FIG. 7 is a diagram illustrating X-ray diffraction patterns of the reduced form in Example 3.

FIG. 7 is a graph illustrating XRD patterns of red-LYB. The results illustrated in FIG. 7 are on the basis of the measurement by using the same method as in Example 1.

Each of the peak tops of the XRD peaks of red-LYB was present between the peak top position of the XRD peak derived from LYB (that is, the position of $\theta$a) and the peak top position of the peak of LiBr (that is, the position of $\theta$b). In this regard, the peak of LiBr illustrated in FIG. 7 is on the basis of the data (ICSD No. 27982) included in the inorganic crystal structure database (ICSD).

Production of Secondary Battery

A secondary battery composed of positive electrode|LY-B|red-LYB was produced in the same manner as in Example 1 except that LYB was used as the halide solid electrolyte material.

Example 4

Production of Halide Solid Electrolyte Material

In an argon glove box at a dew point of lower than or equal to −60° C., LiCl, YCl$_3$, and ZrCl$_4$ serving as raw material powders were weighed at a molar ratio of LiCl:YCl$_3$:ZrCl$_4$=5:1:1. Thereafter, these raw material powders were mixed, and the resulting mixture was subjected to milling treatment for 25 hours at 600 rpm by using a planetary ball mill (Model P-5 produced by Fritsch). In this manner, a powder of the halide solid electrolyte material Li$_{2.5}$Zr$_{0.5}$Y$_{0.5}$Cl$_6$ (hereafter referred to as "LZYC") was obtained.

Production of Halide Reduced Form

Figure 8:
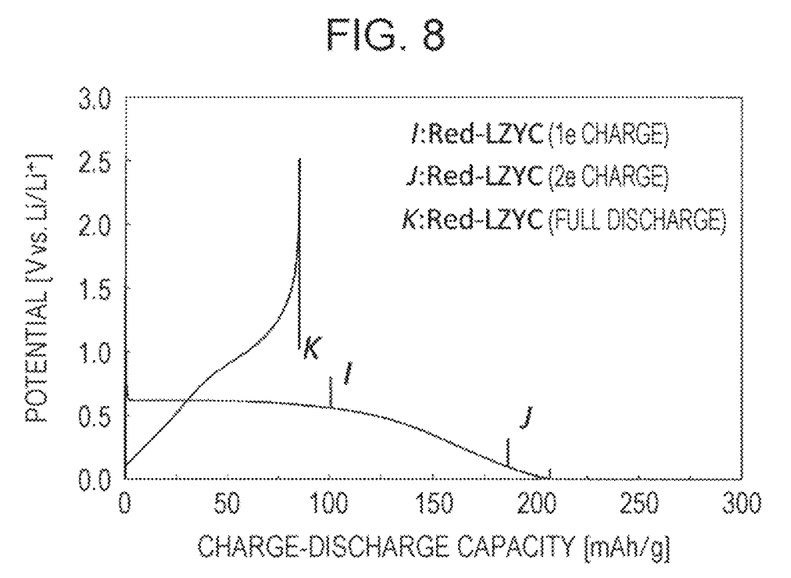
FIG. 8 is a diagram illustrating a charge-discharge curve of a reduced form in Example 4.

An electrochemical cell was produced in the same manner as in Example 1 except that LZYC was used as the halide solid electrolyte material. Regarding production of a reduced form of LZYC (hereafter referred to as "red-LZYC"), each of red-LZYC (1e charge), red-LZYC (2e charge), and red-LZYC (full discharge) was obtained in the same manner as in Example 1. The charge-discharge curve of each red-LZYC is illustrated in FIG. 8. In this regard, FIG. 8 illustrates a potential on a Li/Li$^+$ basis as in FIG. 2.

X-Ray Diffraction (XRD) Pattern of Halide Reduced Form

Figure 9:
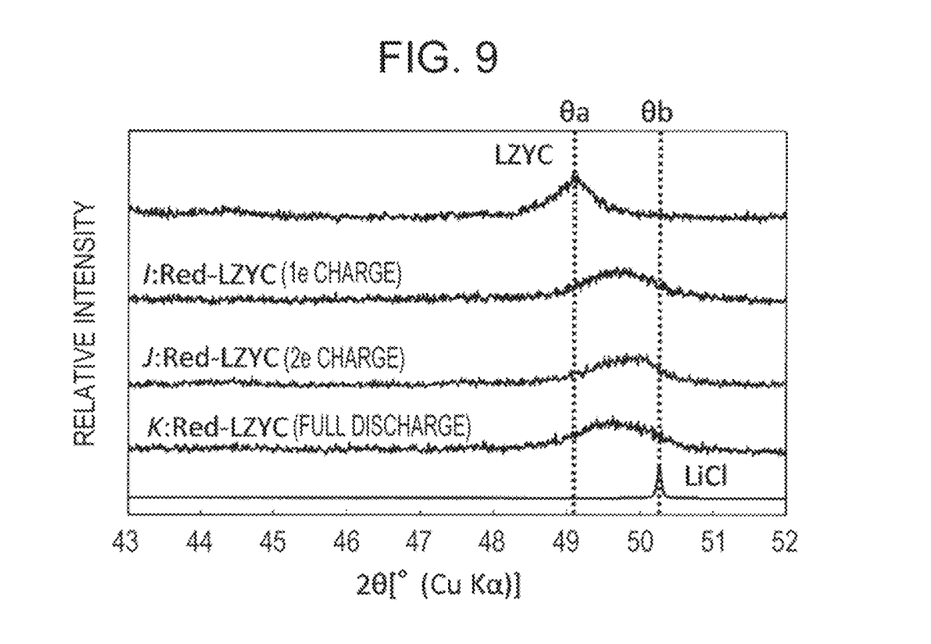
FIG. 9 is a diagram illustrating X-ray diffraction patterns of the reduced form in Example 4

FIG. 9 is a graph illustrating XRD patterns of red-LZYC. The results illustrated in FIG. 9 are on the basis of the measurement by using the same method as in Example 1.

Each of the peak tops of the XRD peaks of red-LZYC was present between the peak top position of the XRD peak derived from LZYC (that is, the position of θa) and the peak top position of the peak of LiCl (that is, the position of θb). In this regard, the peak of LiCl illustrated in FIG. 9 is on the basis of the data (ICSD No. 26909) included in the inorganic crystal structure database (ICSD).

Production of Secondary Battery

A secondary battery composed of positive electrode|LZYC|red-LZYC was produced in the same manner as in Example 1 except that LZYC was used as the halide solid electrolyte material.

Comparative Example 1

Production of Sulfide Solid Electrolyte Material

In an argon glove box at a dew point of lower than or equal to −60° C., Li$_2$S, P$_2$S$_5$, and GeS$_2$ serving as raw material powders were weighed at a molar ratio of Li$_2$S:P$_2$S$_5$:GeS$_2$=5:1:1. These raw material powders were pulverized in a mortar and mixed. Thereafter, milling treatment was performed for 10 hours at 510 rpm by using a planetary ball mill (Model P-7 produced by Fritsch). In this manner, a sulfide solid electrolyte material Li$_{10}$GeP$_2$S$_{12}$ (hereafter referred to as "LGPS") was obtained.

Production of Secondary Battery

A secondary battery composed of positive electrode|LGPS|red-LGPS was produced in the same manner as in Example 1 except that LGPS was used as the halide solid electrolyte material.

Evaluation of Battery
Charge-Discharge Test

A charge-discharge test was performed by using the battery of each of Examples 1 to 4 and Comparative example 1 under the following condition.

The battery was placed in a constant temperature bath at 25° C.

Discharge at a current density of current value 0.1 mA/cm$^2$ was performed and completed at a voltage of 2.5 V. Subsequently, charge at a current density of current value 0.1 mA/cm$^2$ was performed and completed at a voltage of 4.2 V.

The above-described charge-discharge was repeated 10 cycles.

In this manner, the discharge capacity of the 10th cycle and the discharge capacity maintenance factor of the 10th cycle (=discharge capacity of 10th cycle/discharge capacity of first cycle) of the battery of each of Examples 1 to 4 and Comparative example 1 described above were obtained. These results are described in Table 1.

TABLE 1

| | Negative electrode material | Solid electrolyte material of electrolyte layer | Discharge capacity of 10th cycle [mAh/g] | Discharge capacity maintenance factor [%] |
|---|---|---|---|---|
| Example 1 | red-LYC | LYC | 54 | 104 |
| Example 2 | red-LYBC | LYBC | 27 | 101 |
| Example 3 | red-LYB | LYB | 29 | 82 |
| Example 4 | red-LZYC | LZYC | 5.2 | 45 |
| Comparative example 1 | red-LGPS | LGPS | 0.032 | 16 |

Observation of Battery Cross Section

Figure 10:
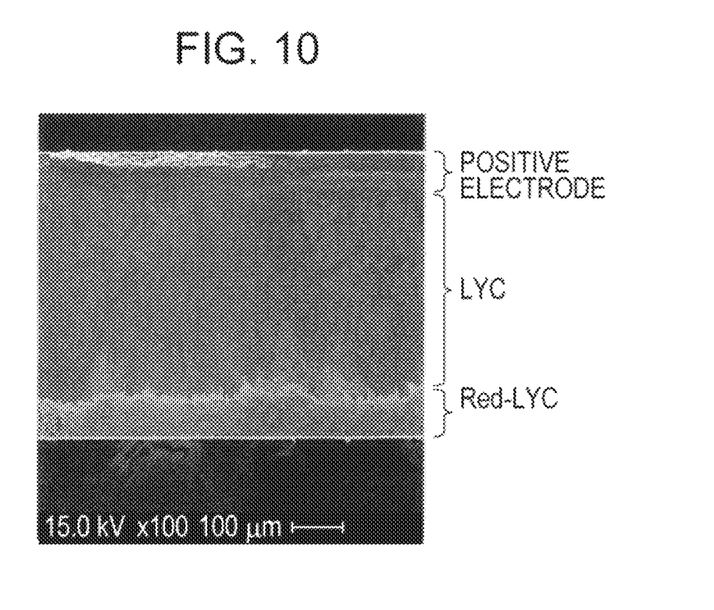
FIG. 10 is a scanning electron microscope (SEM) observation image illustrating a cross section of the battery in Example 1.
Figure 11:
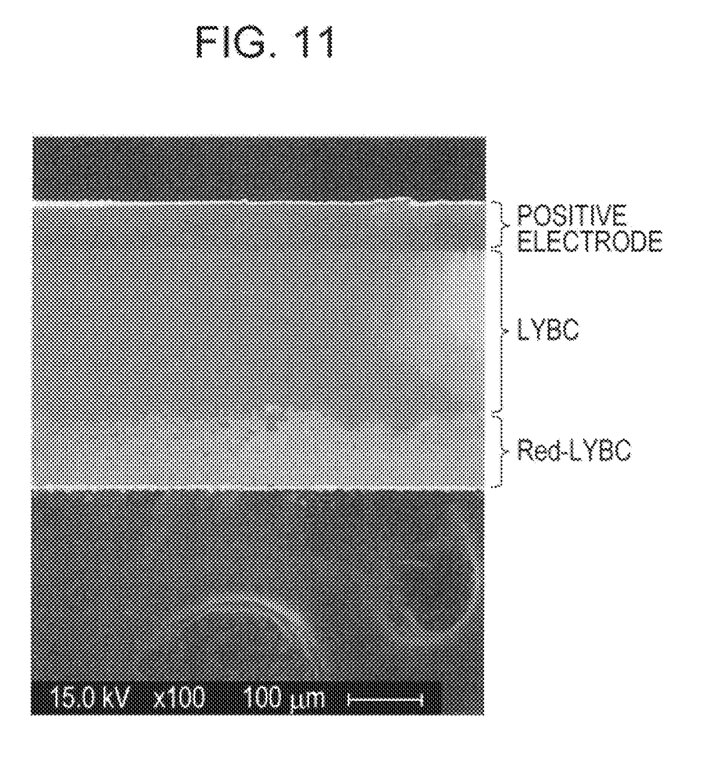
FIG. 11 is an SEM observation image illustrating a cross section of the battery in Example 2.

FIG. 10 and FIG. 11 illustrate cross-section observation images of the batteries of Example 1 and Example 2, respectively. The cross-section observation image was acquired by subjecting the battery after the charge-discharge test to cross-section processing by using a cross-section polisher (CP) and by using a scanning electron microscope (SEM). As illustrated in FIGS. 10 and 11, it was ascertained that the battery of each of Example 1 and Example 2 was a battery composed of the negative electrode containing the halide reduced form, the solid electrolyte layer containing the halide solid electrolyte material, and the positive electrode.

Consideration

According to the results of Examples 1 to 4 and Comparative example 1 described in Table 1, the discharge capacity of the 10th cycle and the discharge capacity maintenance factor of the 10th cycle of the battery including the negative electrode material containing the halide reduced form were higher compared with the battery including the negative electrode material containing the sulfide reduced form. That is, It was ascertained that the cycle characteristics of the battery including the negative electrode containing the halide reduced form is improved.

The battery according to the present disclosure may be used as, for example, all-solid lithium ion secondary batteries.

What is claimed is:

1. A negative electrode material comprising a reduced form of a solid electrolyte material,
wherein the solid electrolyte material is denoted by Formula (10) below, $$Li_{3-3\delta-a}Y_{1+\delta-a}Me_aCl_{6-x-y}Br_xI_y \qquad \text{Formula (10)}$$

wherein Me represents at least one element selected from the group consisting of Zr, Hf, and Ti; and wherein
−1<δ<1,
0≤a<1.5,
0<(3−3δ−a),
0<(1+δ−a),
0≤x≤6,
0≤y≤6,
(x+y)≤6 are satisfied,
wherein a peak top is present at the value of the diffraction angle 2θ within the range of greater than θa and less than or equal to θb in an X-ray diffraction pattern of the reduced form obtained by X-ray diffraction measurement in which the Cu—Kα ray is used as a radiation source, θb is a value of the diffraction angle 2θ of the peak top of a peak reflecting the (220) face of LiX composed of Li and X, where X represents at least one element selected from the group consisting of F, Cl, Br, and I, and
θa is a value of the diffraction angle 2θ of the peak top of a peak derived from the solid electrolyte material and is a value closest to θb.

2. The negative electrode material according to claim 1, wherein Me further contains zirconium.

3. The negative electrode material according to claim 1, comprising the reduced form alone.

4. A battery comprising:
a negative electrode containing the negative electrode material according to claim 1;
a positive electrode; and
an electrolyte layer disposed between the negative electrode and the positive electrode.

5. The battery according to claim 4, wherein the negative electrode is composed of the negative electrode material alone.

6. The negative electrode material according to claim 1, wherein Li is occluded in the reduced form.

7. The negative electrode material according to claim 1, wherein the negative electrode material contains greater than or equal to 80% by mass of the reduced form.

8. The negative electrode material according to claim 7, wherein the negative electrode material consists of the reduced form.

9. A negative electrode material comprising a reduced form of a solid electrolyte material,
wherein
the solid electrolyte material is denoted by Formula (3) below, $$Li_d Me2_e Zr_f X_6 \qquad \text{Formula (3)}$$

herein, in Formula (3) above,
d, e, and f satisfy $d+m_2 e+3f=6$ and $f>0$,
Me2 represents at least one element selected from the group consisting of metal elements except Li, Y, and Zr and semimetals, and
$m_2$ represents the valence of Me2 above.

10. A battery comprising:
a negative electrode containing the negative electrode material according to claim 9;
a positive electrode; and
an electrolyte layer disposed between the negative electrode and the positive electrode.

* * * * *